(12) United States Patent
Gumhold

(10) Patent No.: US 6,469,701 B1
(45) Date of Patent: Oct. 22, 2002

(54) METHOD FOR COMPRESSING GRAPHICAL INFORMATION

(76) Inventor: Stefan Gumhold, Spemanstrasse 7, D-72076 Tuebingen (DE)

( * ) Notice: Subject to any disclaimer, the term of this patent is extended or adjusted under 35 U.S.C. 154(b) by 0 days.

(21) Appl. No.: 09/356,581

(22) Filed: Jul. 19, 1999

(51) Int. Cl.[7] .............................................. G06T 17/00
(52) U.S. Cl. ...................................... 345/419; 345/473
(58) Field of Search ................................ 345/418, 419, 345/420, 423, 424, 473, 474

(56) References Cited

PUBLICATIONS

Esther M. Arkin, Martin Held, Joseph S. B. Mitchell, Steven S. Skiena, Hamiltonian Triangulations for Fast Rendering.
Reuven Bar–Yehuda and Craig Gotsman, Time/Space Tradeoffs for Polygon Mesh Rendering, ACM Transactions on Graphics, vol. 15, No. 2, Apr. 1996, pp. 141–152.
Michael Deering, Geometry Compression, Computer Graphics Proceedings, Annual Conference Series, 1995.
Francine Evans, Steven Skiena, Amitabh Varshney, Optimizing Triangle Strips for Fast Rendering.
Gabriel Taubin and Jarek Rossignac, Geometric Compression Through Topological Surgery, ACM Transactions on Graphics, vol. 17, No. 2, Apr. 1998.
Daniel Cohen–Or, David Levin, Offir Remez, Progressive Compression of Arbitrary Triangular Meshes.
J. Rossignac, Edgebreaker: Compressing the Incidence Graph of Triangle Meshes, Technical Report GIT–GVU–98–17, May 22, 1998 (Revised Jun. 16, 1998).
Costa Touma, Craig Gotsman, Triangle Mesh Compression.

*Primary Examiner*—Cliff N. Vo
(74) *Attorney, Agent, or Firm*—Quarles & Brady LLP

(57) ABSTRACT

A new compressed representation for the connectivity of a triangle mesh. Local compression and decompression algorithms are disclosed which are fast enough for real time applications. The achieved space compression rates keep pace with the best rates reported for any known global compression algorithm. These properties have great benefits for several important applications. Naturally, the technique can be used to compress triangle meshes without significant delay before they are stored on external devices or transmitted over a network. The presented decompression algorithm is very simple allowing a possible hardware realization of the decompression algorithm which could significantly increase the rendering speed of pipelined graphics hardware.

18 Claims, 3 Drawing Sheets

METHOD FOR COMPRESSING GRAPHICAL INFORMATION

Triangle meshes have become the most common representation for complex surfaces. Most three dimensional objects available on the internet are supplied in a format which is based on triangle meshes or polygonal meshes, which can easily transformed into triangle meshes. Especially, in the domain of the internet storage space efficient representations of triangle meshes are important. Therefore a wide variety of compression algorithms are available.

3D-hardware support is primarily based on the rendering of triangles. Each triangle is specified by its three vertices, where each vertex contains three coordinates, possibly the surface normal, material attributes and/or texture coordinates. The coordinates and normals are specified with floating point values, such that a vertex may contain data of up to 36 bytes. Thus the transmission of a vertex is expensive and the simple approach of specifying each triangle by the data of its three vertices is wasteful as for an average triangle mesh each vertex must be transmitted six times.

The introduction of triangle strips helped to save unnecessary transmission of vertices. Two successive triangles in a triangle strip join an edge. Therefore, from the second triangle on, the vertices of the previous triangle can be combined with only one new vertex to form the next triangle. As with each triangle at least one vertex is transmitted and as an average triangle mesh has twice as many triangles as vertices, the maximal gain is that each vertex has to be transmitted only about two times. Two kinds of triangle strips are commonly used—the sequential and the generalized triangle strips. In generalized triangle strips an additional bit is sent with each vertex to specify to which of the free edges of the previous triangle the new vertex is attached. Sequential strips even drop this bit and impose that the triangles are attached alternating.

It is an object of this invention to propose a method for compressing and decompressing large geometric data sets which is fast and simple.

SUMMARY OF THE INVENTION

The method of the invention compresses triangle meshes which consist of a list of vertices and a list of triangles, each triangle containing the three vertex indices and the indices of the three edge-adjacent triangles. If the latter adjacency information is not known it can be easily computed through hashing.

The invention is based on a region growing traversal of the triangle mesh starting for each edge-connected component with an arbitrary triangle of this component. The border of the growing region is called the cut-border. It divides the mesh into the inner and the outer part, which contain already compressed and the remaining triangles respectively.

Triangles are added to the inner part at a distinguished current cut-border edge which will be called the gate. After each addition of a triangle the gate moves on to another cut-border edge, until all triangles of an edge-connected component of the triangle mesh have been compressed. This is done for each edge-connected component.

The compressed representation contains for each triangle a bit code of an operation identifier which tells how the triangle was formed upon the gate. There are three cases: the gate is an edge of the mesh border, the gate forms a triangle with a vertex on the cut-border or the triangle is formed with a new vertex. The different operations are called "border", "new vertex" and "connect". The "connect" operations take one parameter which specifies the offset of the third vertex relative to the gate. The "connect" operations with offset one and minus one are also called "connect forward" and "connect backward". All other "connect" operations split the cut-border into two loops. As the triangle meshes describe two dimensional surfaces in three dimensional space, two cut border loops can grow together again, actually once for each handle of the triangle mesh. The operation which unifies two loops is called "union" and takes two parameters, the index of the second loop and the offset of the third triangle vertex within this loop.

The cut-border data structure basically consists of a stack of doubly linked lists containing the vertices—or their indices—, which are adjacent to triangles of the inner and the outer part at the same time.

Data at the faces, edges or vertices such as their coordinates are included in the compressed representation each time a new mesh element is added to the cut-border—for example the vertex coordinates of vertex v[i] are encoded after the "new vertex" operation which introduces v[i] into the cut-border.

The decompression algorithm builds the mesh in the same order as the compression algorithm traverses the original mesh. With the help of the indices attached to the "connect" operations the original connectivity can be reconstructed with permuted vertices and triangles. During decompression the edge adjacency information can be reconstructed with no additional cost.

SHORT DESCRIPTION OF THE DRAWINGS

Figure 1:
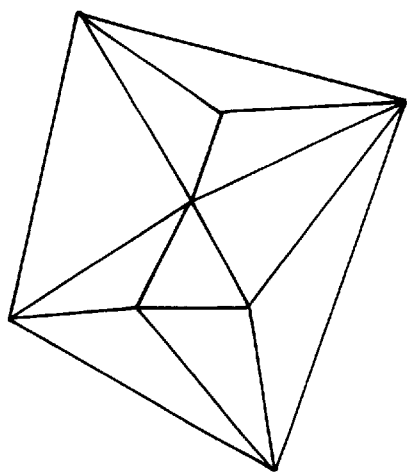
FIG. 1 is a sample triangle mesh.

FIG. 1 shows a very simple example of a triangle mesh. This mesh has 8 vertices. The FIGS. 2–9 show, how the mesh of FIG. 1 is built-up by some operations, which are now described in detail.

Figure 2:
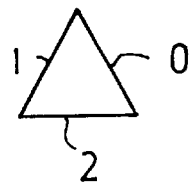
FIG. 2 is a starting triangle for the mesh of FIG. 1.
Figure 3:
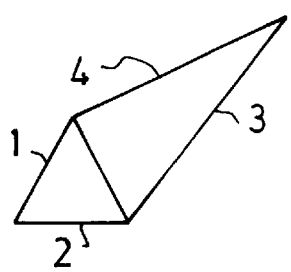
FIGS. 3–9 are the status after adding a further triangle in a step-wise manner.

The method starts with an initial triangle 1 shown in FIG. 2. This triangle has three vertices which are connected by three edges 0, 1 and 2. All edges are straight and connect adjacent vertices. In a predetermined order (counter clockwise) the edges are enumerated. The line made up of edges 0, 1 and 2 is the cut-border.

Now first the edge 0 is connected with a further triangle, namely by connecting both vertices, between which the edge 0 is spanned, to an new vertex by two edges 3 and 4. The outer circumference (1-2-3-4) of the area of the two triangles is now the cut-border.

Figure 4:
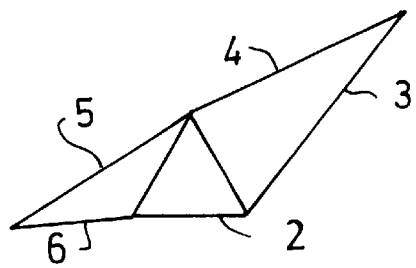

In a next step the edge with the following number (1) is connected by two edges 5 and 6 to a new vertex, see FIG. 4. The line 2-3-4-5-6 is now the cut-border.

Figure 5:
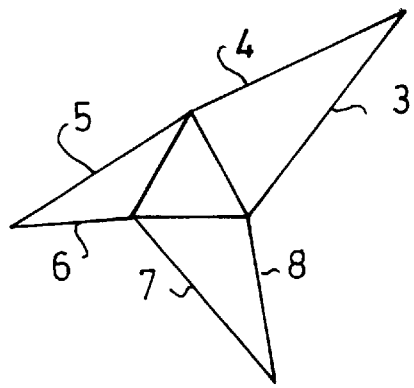
Figure 6:
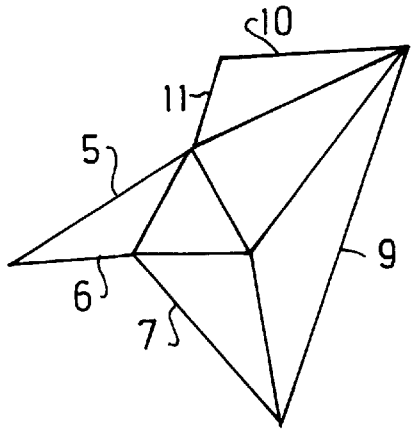

The same step is repeated for the edge 2, see FIG. 5. The cut-border is now 3-4-5-6-7-8.

Now the edge with the following number (3) is connected to an already connected vertex, by forming a triangle with the preceding cut-border edge. This kind of operation is called "connect backward".

At the now following edge 4 a new vertex is connected by edges 10 and 11. This step is shown together with the previous step in FIG. 6.

Figure 7:
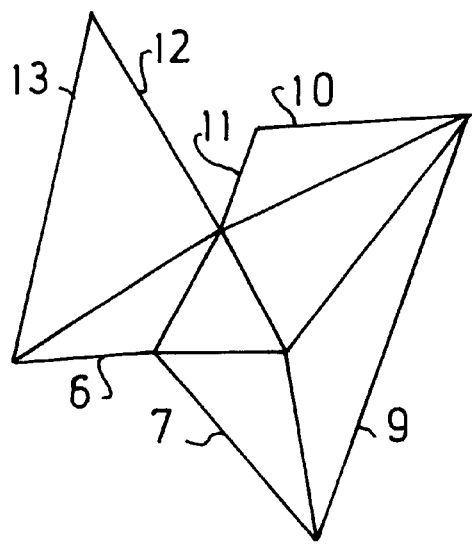

The now following edge 5 is connected to a new vertex by two new edges 12 and 13, see FIG. 7.

Edge 6 is connected with a vertex by forming a triangle with a subsequent edge (7). This operation is called a "connect forward".

For edge 9, which forms already a part of the outer circumference of the whole mesh, no triangle is to be added. This operation is called a "border" operation.

Figure 8:
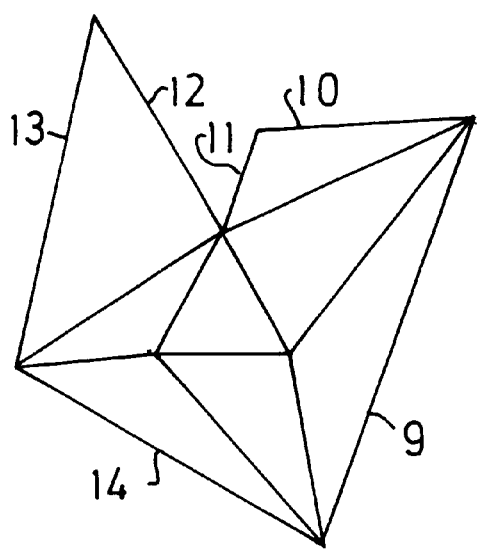
Figure 9:
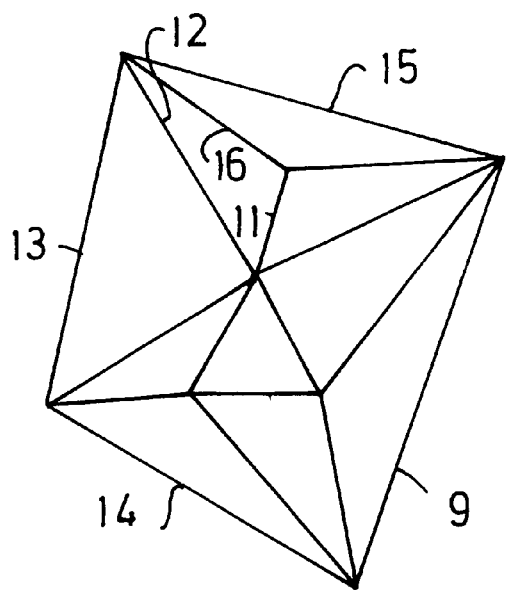
Figure 10:
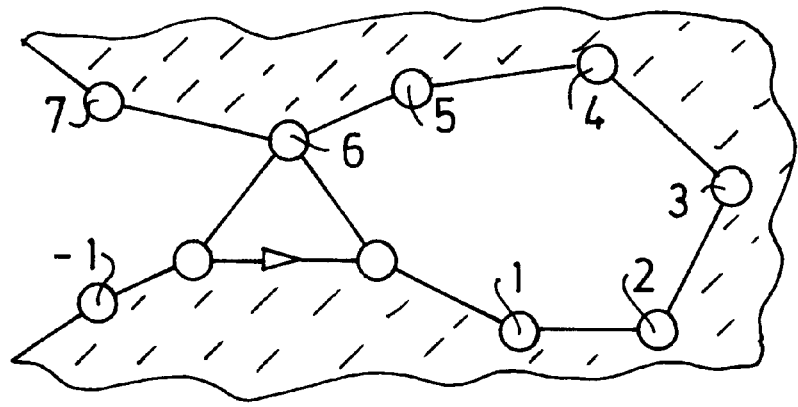
FIG. 10 is a diagram showing a split cut-border operation.

A more complex operation appears at cut-border edge 10 in FIG. 8. The adjacent triangle in the outer part is neither formed with the preceding nor with the subsequent cut-border vertex, but with a vertex further apart. The result is that the cut-border splits into two parts. In FIG. 9 the first part is formed by the edges 11, 12 and 16 and the second part by 9, 13, 14 and 15. This operation will be called "split cut-border", which takes the index i to specify the third vertex relative to the current cut-border edge. FIG. 10 shows another "split cut-border"—operation. The relative indices are written into the cut-border vertices. The "split cut-border" operation has two consequences. Firstly, the cut-border cannot be represented anymore by a simple linked list, but by a list of linked lists. And secondly, the choice of the next cut-border part to be processed after a "split cut-border" operation yields a new degree of freedom for the traverse order. To minimize the number of cut-border parts the cut-border part with fewer vertices is chosen.

Figure 11:
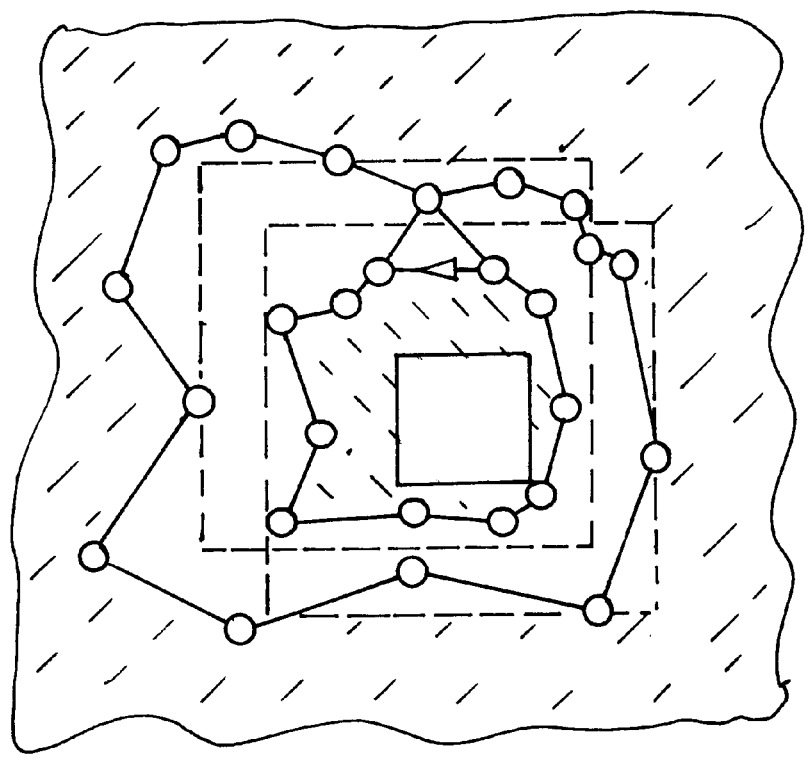
FIG. 11 is a diagram showing a cut-border union operation.

Another operation arises in FIG. 9 at cut-border edge 11. The adjacent triangle closes the triangle mesh and the current cut-border part is removed. This operation is called "close cut-border". As the size of the current cut-border part is known during compression and decompression, the "close cut-border" operation can also be encoded with "connect forward" or "connect backward" and the different naming is only introduced for didactic reasons. On the other hand if there really is a hole in the form of a triangle, three "border" operations are encoded. Finally, there exists a somewhat inverse operation to the "split cut-border" operation—the "cut-border union" operation. An example is visualized in FIG. 11. The figure shows in perspective a cube with a quadratic hole. The so far compressed inner part consists of the two shaded regions. There are two cut-border parts which are connected by the new triangle, which is attached to the current edge. Therefore, this operation is called "cut-border union" or for short union. Two indices are needed to specify the second cut-border part p and the index i of the vertex within the second cut-border part. The vertices in a cut-border part are enumerated according to the cut-border edges. Therefore, the vertex at the beginning of the cut-border edge with the smallest index in the cut-border part p is numbered zero, the vertex at the second smallest cut-border edge is numbered one and so forth. It can be shown that the number of "cut-border union" operations is exactly the genus of the compressed triangle mesh. Seen from a different angle, the operations "close cut-border", "connect", "split cut-border" and "union" provide the possibility to connect the current cut-border edge to any possible vertex in the cut-border, whereas the operations "initial triangle" and "new vertex" utilize new vertices. The encoding of the sequence of atomic building operations uniquely defines the connectivity of a triangle mesh. The connectivity of the sample mesh in the FIGS. 2–9 can be encoded by a sequence of operations. The different operations can be encoded with Huffman Codes or adaptive arithmetic coding to achieve good compression rates. Therefore, the mesh connectivity is sequentially stored in a bit stream. The geometry and material data must be supplied additionally. For each vertex this data can include the vertex position, the surface normal at the vertex and the texture coordinates or some material information. We will refer to all this data with the term vertex data. The material of the mesh can also be given for each triangle. Similarly, data can be supplied for the inner edges and the border edges of the mesh. We will collect the different kinds of data in the terms triangle data, the inner edge data and the border edge data. Thus for each type of mesh element, data can be supplied with the connectivity of the mesh. We refer to the collection of all additional data with the term mesh data. Depending on the application there exist two approaches to combine the connectivity and the mesh data of a compressed triangle mesh. If an application is supplied with enough storage for the complete mesh data, the bit stream for the connectivity can be stored separately. For each type of mesh element the specific data is stored in an array. While the triangle mesh is traversed a vertex, triangle, inner edge and border edge index is incremented after each operation, such that the current mesh elements can be found in the corresponding arrays with the suitable indices. The advantage of this representation is that the mesh data can be processed without traversing the mesh, for example to apply transformations to the coordinates and normals. If the compressed triangle mesh is passed to the graphics board or if the mesh data is encoded with variable length values, no random access to the vertex data is possible. Then the mesh data is inserted into the bit stream for the mesh connectivity. After each operation symbol in the stream, the corresponding mesh data is sent to the stream appropriately. For example after a "split cut border" symbol the mesh data for one inner edge and one triangle is transmitted. If we only assume vertex and triangle data and denote the vertex data for the i-th vertex with v[i] and the triangle data for triangle j with t[j], the extended bit stream representation of the mesh in FIG. 1 would be:

v[0]v[1]v[2]t[0] newvertex v[3]t[1] newertex v[4]t[2] newvertex v[5]t[3] connectbackward t[4] newvertex v[6]t[5] newvertex v[7]t[6] connectforward t[7] border splitcutborder[2] t[8] connectforward t[9] border border border Remember that the initial triangle is implicitly stored without symbol and introduces the vertices v[0], v[1], v[2] and the triangle t[0]. If the triangle mesh consists of several unconnected components, the compressed bit stream representation consists of the concatenation of the bit streams of the different components.

Implementation

All algorithms which process the compressed representation are based on the implementation of the data structure for the cut-border as shown below. This data structure implements the rules which define the traverse order. All other algorithms such as the compression and decompression algorithms use this implementation. Further algorithms such as homogeneous transformations of the mesh geometry would also use the cut-border data structure to iterate through the compressed representation. The data structures and algorithms are given in a C++- like syntax. For readability and brevity parentheses were replaced by indentation and additional key-words.

Cut-Border Data Structure

Data Structure 1 cut border struct Part int rootElement, nrEdges, nrVertices;

struct Element int prev,next;

Data data;

bool isEdgeBegin;

```
struct CutBorder
    Part *parts, *part;
    Element *elements, *element;
    Element *emptyElements;
        CutBorder (int maxParts, int maxElems); bool atEnd
            ();
        void traverseStep(Data &vo, Data &v1);
        void initial(Data v0, Data v, Data v2);
        void newVertexn(Data v);
        Data connectForward/Backword();
        void border();
        Data splitCutBorder(int i);
        Data cutBorderUnion(int i,int p);
        bool findAndUpdate(Data v, int i, int p);
```

The data structure for the cut-border is a list of doubly linked lists storing the vertex data of the buffered vertices. All elements in the doubly linked lists of the different parts are stored within one homogeneous buffer named "elements". The maximum number of vertices in the buffer during the compression or decompression defines its size. The maximum buffer size is known once the triangle mesh is compressed and can be transmitted in front of the compressed representation. For the first compression of the mesh the maximum number of vertices can be estimated by $10*sqrt(n)$, where n is the number of vertices in the triangle mesh. With this approach a simple and efficient memory management is feasible. Only the pointer emptyElement is needed, which points to the first of the empty elements in the buffer. Any time a new element is needed, it is taken from the empty elements and the deleted elements are put back to the empty elements. On the one hand the memory management avoids dynamic storage allocation which is not available on graphics boards and on the other hand it speeds up the algorithms by a factor of two if no memory caches influence the performance.

The different parts can be managed with an array parts with enough space for the maximum number of parts which are created while the mesh is traversed. Again this number must be estimated for the first compression and can be transmitted in front of the compressed representation. Thus the constructor for the cut-border data structure takes the maximum number of parts and the maximum number of cut-border elements. part and element point to the current part and the current element within the current part respectively. Each part stores the index of its root element, the number of edges and the number of vertices. These numbers may differ as each part is not simply a closed polygon. Any time a "border"-operation arises one cut-border edge is eliminated but the adjacent cut-border vertices can only be removed if they are adjacent to two removed edges. Therefore, each cut-border element stores in addition to the indices of the previous and next element and the vertex data, a flag which denotes whether the edge beginning at this cut-border element belongs to the cut-border or not. The cut-border data structure provides methods to steer the traversal via a bit stream or with the help of a triangle mesh. The methods atEnd() and traverseStep(&v0, &v1) are used to form the main loop. The method traverseStep(&v0, &v1) steps to the next edge in the cut-border data structure and returns the vertex data of the two vertices forming this edge. If no more edges are available, atEnd() becomes true. During decompression the operations are read from the bit stream and the cut-border data structure is updated with the corresponding methods initial, newVertex, connectForward/Backward, border, splitcutborder and cutborderUnion. For compression addionally the method findAndUpdate is needed to localize a vertex within the cut-border data structure. The part index and vertex index are returned and can be used to deduce the current building operation. If the vertex has been found by the findAndUpdate-method, it is connected with the current cut-border edge.

Compression Algorithm

Besides the cut-border we need two further data structures for the compression algorithm—a triangle mesh, with random access to the third vertex of a triangle given a half edge, and a permutation. The random access representation of the triangle mesh provides two methods—chooseTriangle(&v0, &v1, &v2) method, which returns the vertex data v[0], v[1], v[2] of the three vertices in an initial triangle, and the method getVertexData (i0, i1) , which takes the vertex indices i0 and i1 of a half edge v[0]v[1] and returns the vertex data of the third vertex of the triangle containing v[0]v[1]. The permutation is used to build a bijection between the vertex indices in the random access representation and the vertex indices in the compressed representation. It allows to map an index of the first kind to an index of the second kind and to determine whether a certain vertex index in the random access representation has been mapped. Given a random access triangle mesh, the compression algorithm computes the mentioned permutation and the compressed representation of the mesh, which is sent to a bit stream. The current vertex index of the compressed representation is counted in the index vertexIdx. After the initial triangle is processed, the cut-border data structure is used to iterate through the triangle mesh. In each step the vertex data v[0] and v[1] of the current cut-border edge is determined. From the vertex indices the vertex data of the third vertex in the triangle adjacent to the current edge is looked up in the random access triangle mesh. If no triangle is found, a "border"-operation is sent to the bit stream. Otherwise it is checked whether the new vertex has already been mapped, i.e. sent to the cut-border. If not, a "new vertex"-operation is sent to the bit stream and the vertex index is mapped to the current index in the compressed representation. If the third vertex of the new triangle is contained in the cut-border, the findAndUpdate-method is used to determine the part index and the vertex index within that cut-border part. If the part index is greater than zero, a "cut-border union" operation is written. Otherwise a "connect forward/backward" operation or a "split cut-border" operation is written dependent on the vertex index.

Algorithm1 compression

Input: RAM . . . random access representation

Output: bitStream . . . compressed representation perm . . . permutation of the vertices

```
vertex1dx=3;
RAM.chooseTriangle (v0,v1,v2);
perm.map((v0.idx,0), (v1.idx,I), (v2.idx,2));
bitStream <<vo<<v1 <<v2;
cutBorder.initial (v0, v1, v2);
while not cutBorderatEnd() do
    cutBorder.traversalStep, (v0, v1);
    v2=RAM.getVertexData (v1.idx, v0.idx);
    if v2.isUndefined() then
        bitStream<<"border";
        cutBorder.border();
    else
        if not perm.isMapped(v2.idx) then
            bitStream<<"new vertex" <<v2 ;
            cutBorder.newVertex (v2);
            perm.map ((v2.idx, vertexIdx++));
``` else
    cutBorder.findAndUpdate(v2, i, p);
    if p>0 then bitStream<<"union[i,p]";
    else if i==+−1 then bitStream<<"connect";
    else bitStream<<"splitcutborder[i]";
Decompression Algorithm The decompression algorithm reads the compressed representation from an input bit stream and enumerates all triangles. The triangles are processed with the subroutine handle (v[0], v[1], v[2]), which for example renders the triangles. As in the compression algorithm, firstly, the initial triangle is processed and then the mesh is re-built with the help of the cut-border methods atEnd and traversalStep. In each step the next operation is read from the bit stream and the corresponding method of the cut-border data structure is called such that the third vertex of the new triangle is determined in order to send it to the subroutine handle.

Algorithm 2 decompression
Input: bitStream . . . compressedrepresentation
Output: handle . . . processes triangles
bitStream>>v[0]>>v[1]>>v[2];
handle (v[0], v[1], v[2]);
cutBorder.initial (v[0], v[1]. v[2]);
while not cutBorder.atEnd() do
    cutBorder.traversalStep(v[0],v[1]);
    bitStream>>operation;
    switch (operation)
        case "connect":
        handle (v[1],v[0], cutBorder:
        connectForward/Backward());
        case "splitcutborder[i]":
        handle(v[1],v[0],cutBorder.splitCutBorder(i));
        case "union[i,p]":
        handle(v[1],v[0], cutBorder.cutBorderUnion(i,p));
        case "newvertex":
        bitStream>>v[2];
        cutBorder.newVertex(v[2]);
        handle(v[1],v[0],v[2]);
        case "border":
        cutBorder.border();

There are a large number of enumeration strategies for the newly introduced cut-border edges. For performance reasons and the simplicity of the implementation, the inventor favored the enumeration strategies which can be implicitly handled with the cut-border data structure introduced in the above. Therefore a newly introduced cut-border edge may either be delayed until all present edges are processed or the new edge is processed next. These two strategies apply to the "connect forward/backward" operations and correspond to attaching the next highest and the next smallest edge index respectively to the new edge. In the case of a "new vertex" operation two new edges are introduced to the cut-border. In this case three possible strategies are feasible. Either the first/second new edge is processed next or both edges are delayed. The "split cut-border" and the "cut-border union" operations arise much more rarely and therefore were excluded from the analysis of the traversal strategy. Thus were left twelve strategies, three choices for the "new vertex" operation and for each "connect" operation two choices. Luckily, it turned out that the strategy, where the new edge is processed next after both "connect" operations and where the second edge is processed next after a "new vertex" operation, is superior over all others. This strategy achieved best compression and kept the cut-border smallest for all measured models.

What is claimed is:

1. Method for compressing graphical information representing a polygonal mesh, according to which an initial polygon consisting of at least 3 vertices and defining a cut-border is selected; a new polygon is added by a building operation, the new polygon having a border in common with the cut-border, such defining a new cut-border; the step of adding a polygon by a building operation is repeated until the whole mesh is covered; the sequence of the building operations is sequentially stored; and the vertex data of the vertices of the polygons is stored in identical order.

2. Method according to claim 1, wherein one of the building operations is a new vertex operation, whereby a new vertex and two edges are added to the cut-border.

3. Method according to claim 1, wherein one of the building operations is a connect backward operation, whereby a polygon is added having an edge in common with a preceding cut-border edge.

4. Method according to claim 1, wherein one of the building operations is a connect forward operation, whereby a polygon is added having an edge in common with a subsequent cut-border edge.

5. Method according to claim 1, wherein one of the building operations is a split cut-border operation, whereby the cut-border is split into two parts.

6. Method according to claim 1, wherein one of the building operations is a close cut-border operation, whereby a hole in the mesh is closed.

7. Method according to claim 1, wherein one of the building operations is a cut-border union operation, whereby two not connected cut-borders are connected.

8. Method according to claim 1, wherein the order of adding polygons is a breadth-first traverse order, in which the edges of the added polygons are enumerated sequentially.

9. Method according to claim 1, wherein the order of adding the polygons is a depth-first order, in which the edges of the new added polygons are enumerated in decreasing order.

10. Method according to claim 1, wherein by following the order one of the edges is already an edge of the mesh, a border operation is carried out.

11. Method according to claim 1, wherein one of the building operations is an operation comprised in the group of new vertex, connect backward, connect forward, border, split cut-border, close cut-border and cut-border-union.

12. Method according to claim 1, wherein the sequence of the building operations defining the mesh connectivity is stored sequentially in a bit-stream.

13. Method according claim 1, wherein the building operations are encoded with a symbol coding scheme as for example Huffman coding or adaptive arithmetic coding.

14. Method according to claim 13, wherein the coding scheme uses Huffman codes.

15. Method according to claim 13, wherein the coding scheme use adaptive arithmetic coding.

16. Method according to claim 1, wherein the vertex data are stored in an array.

17. Method according to claim 1, wherein the vertex data comprise the vertex position, the surface normal and the texture coordinates.

18. Method according to claim 1, wherein the vertex data are inserted into the bit stream representing the connectivity of the mesh.

* * * * *